Jan. 30, 1962 H. C. SCHIFFER 3,019,332
LIGHTING FIXTURE AND CONNECTOR THEREFOR
Filed June 3, 1959 2 Sheets-Sheet 1
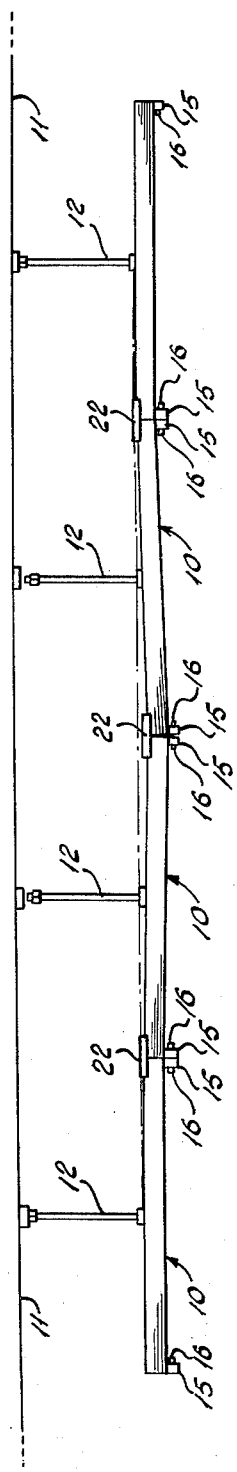
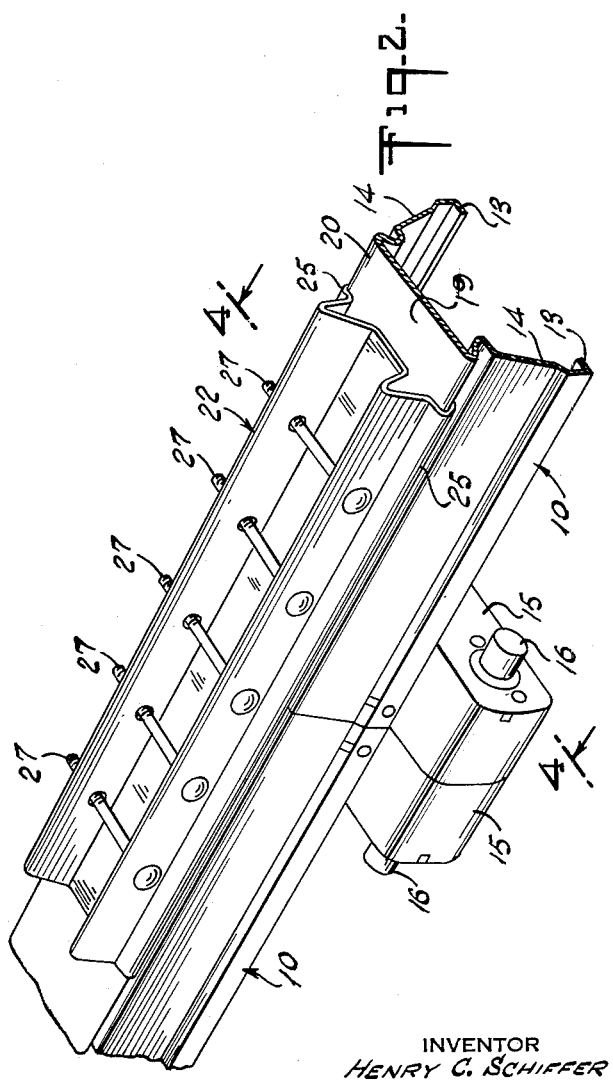
INVENTOR
HENRY C. SCHIFFER
BY
ATTORNEY Jan. 30, 1962 H. C. SCHIFFER 3,019,332
LIGHTING FIXTURE AND CONNECTOR THEREFOR
Filed June 3, 1959 2 Sheets-Sheet 2
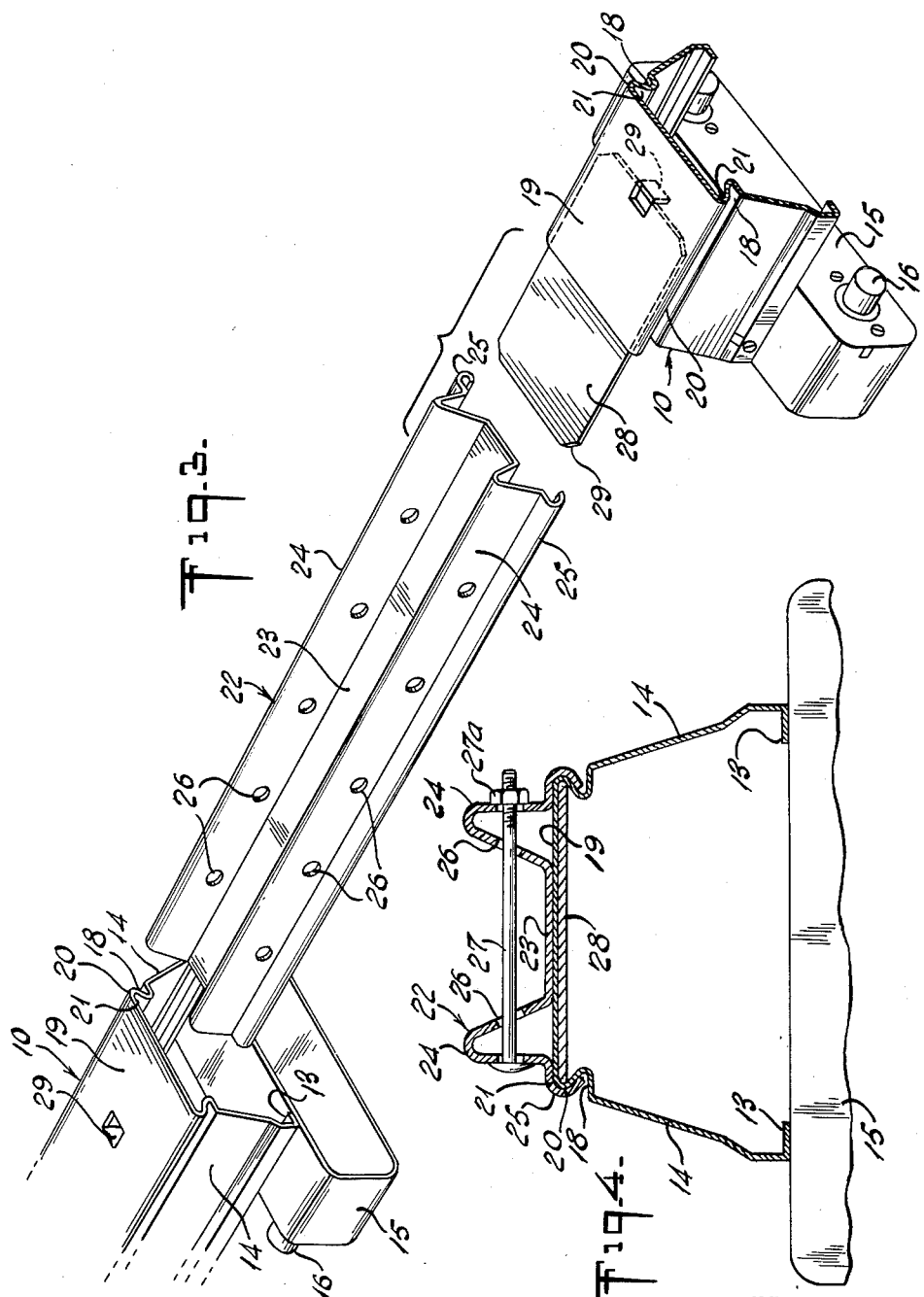
INVENTOR
HENRY C. SCHIFFER
BY
ATTORNEY United States Patent Office
3,019,332
Patented Jan. 30, 1962

3,019,332
LIGHTING FIXTURE AND CONNECTOR
THEREFOR
Henry C. Schiffer, Cheshire, Conn., assignor to The Miller Company, Meriden, Conn., a corporation of Connecticut
Filed June 3, 1959, Ser. No. 817,780
3 Claims. (Cl. 240—9)

This invention relates to improvements in multisection lighting fixtures and joining means therefor.

Modern lighting applications, particularly of the fluorescent type, frequently require relatively long continuous zones of illumination as, for example, above assembly tables, factory aisles, long counters and the like. In such cases it is desirable in point of both initial cost and maintenance to employ standard fluorescent tubes disposed end-to-end throughout the length of the zone. It is further desirable that each tube or set of parallel tubes be mounted in a unitary supporting structure.

Accordingly it is an object of the present invention to provide an improved fixture composed of individual sections and cooperating connectors which, for instance, may be readily assembled on the floor below the place of installation to form a fixture of any desired length and then quickly and easily be raised for attachment to ceiling supports.

A further object is to provide a fixture combination including joining means of the above nature adapted to secure the sections together without the need for riveting, welding or the like, and at the same time afford great flexibility in positioning ceiling supports or suspension points. For instance, with the invention, fewer ceiling supports are required and the supports need not be uniformly spaced. In this way, ceiling obstructions can be avoided and the suspension points can be located to coincide with ceiling beams or other supporting members.

A further object is the provision of joining means for joining elongated lighting fixtures which automatically guides adjacent sections into proper alignment during assembly and assumes accurate alignment in the joined position.

A further object is to provide joining apparatus including exterior clamping means and interior backing means, whereby the walls of the main fixture sections may be made of relatively thin material without danger of buckling or distortion under firm clamping pressure.

Another object is to provide a structural combination by which a relatively long multi-sectional fixture assembly may readily be mounted in operational position with the use of minimum manpower.

A further object is to provide a fixture of the above type which is simple, strong and stable, and low in cost.

Other objects and advantages of the invention will become more apparent from the following description in connection with the accompanying drawings, in which:

FIGURE 1 illustrates a typical four-section assembly in process of installation.

FIGURE 2 is a perspective view of an assembled joint with a connector in place on the fixtures;

FIGURE 3 is an exploded perspective detail view of the end portions of two typical fixture sections, the exterior clamping member, and the interior backing and guide plate; and FIGURE 4 is an enlarged cross-sectional view of a main fixture channel with the joining means applied thereto.

Referring to FIGURE 1, the four numerals 10 generally designate four main fixture sections pre-assembled in a unitary structure for suspension from a ceiling or other overhead support 11 by means of conduit tubes 12. The full lines in FIGURE 1 show the device in partially mounted position, that is with only the end tubes 12 attached to the support 11 and the intermediate tubes standing clear thereof. Subsequent attachment of the intermediate tubes, the advantage of which procedural order is hereinafter set forth, brings the sections into horizontal alignment as indicated by the dot-and-dash line. The joining means by which the sections are firmly secured together is shown in typical assembled position in FIGURE 2, the individual parts of this subassembly appearing in definitive detail in FIGURES 3 and 4.

It will be noted in FIGURE 3 that the main bodies of the fixture sections 10 are formed as inverted channels, open at the ends and having inwardly turned lips or flanges 13 along the lower edges of the side walls 14. Secured to the flanges 13 under each end of each channel section is a transverse housing 15 which spans the channel and extends laterally outward on both sides. Fluorescent tube receptacles 16 of any suitable type are mounted in the inner walls of these housings. The receptacles 16 at the two ends of each fixture section 10 are disposed in inwardly opposed alignment as illustrated in FIGURE 1, the linear spacing of each opposing pair being that necessary to cooperatively receive a fluorescent tube of a predetermined standard length. The outer or end faces of the housings 15 may be open prior to final assembly as shown in FIGURE 3, and are flush with the ends of the main channel members 10, the open initial construction providing ready access for pre-wiring the receptacles.

The side walls 14 of the channel 10 are formed with single inward grooves or corrugations 18 spaced a short distance below the top wall 19 of the channel, thus forming outwardly convex ribs 20 and corresponding interior opposed grooves 21 just below the top 19.

An elongated clamping member 22 of relatively heavy sheet metal has a central web 23 adapted to closely overlie the top 18 of the channel 10 and inverted V-shaped sides 24 terminating in inwardly directing jaws 25 adapted to grasp the ribs 20. Rows of aligned transverse holes 26 in the sides 24 are provided to receive cross bolts 27 as illustrated in FIGURES 2 and 4.

A second element of the joining means is a rectangular metal plate 28 of substantial thickness. This plate, which has rounded or bevelled corners 29, is of a width permitting it an easy sliding fit in the opposed grooves 21 of the sections 10 when the latter are unclamped position as shown in FIGURE 3.

As previously noted, the internal receptacle wiring and interconnections within each fixture section 10 may advantageously be installed prior to assembly, but as the nature of such electrical connections is well known, their presence will be understood but need not be shown herein, in order to illustrate most clearly the mechanical details of structure and assembly procedure. The normal procedure of assembly is as follows:

The sections 10 to be joined are placed end-to-end on the floor or other flat surface in spaced relation as shown in FIGURE 3. The plate 28 is slid into the grooves 21 of one section 10, and a small tab 29 or other internal stop means may be employed to prevent entry substantially beyond one-half the plate's length as shown. Next the exterior clamping member 22, in which two or more of the bolts 27, preferably have been loosely pre-installed, is slid for a portion of its length into place on the same section 10 holding the protruding plate 28, the jaws 25 riding along the ribs 20. The two sections 10 are then pushed together, the jaws 25 of the exterior clamping member sliding in guiding relation along the ribs 20 of the second section 10 while the plate 28 similarly engages the internal grooves 21 thereof, until the two sections come into abutment as shown in FIGURE 2. Thereafter the bolts 27 are tightened by means of their nuts 27a, FIGURE 4.

As the bolts are tightened the jaws 25 apply inward pressure to the ribs 20, contracting the latter until any slight clearance between the internal backing plate 28 and the grooves 21 is taken up, after which further pressure is resisted by the plate itself. Since as previously noted the plate 28 is made of comparatively thick metal, it provides substantially rigid transverse backing for the metal of the main channel in the clamping zone, allowing the use of clamping pressure which would otherwise collapse the channel. At the same time, the tight clamping of the two adjacent channel ends between parallel internal and external clamping elements of substantial length automatically provides permanent alignment of the joined sections. The relatively long overlap of the exterior clamping member 22 on both sides of the joint obviously results in a strongly reinforced structure, while the greater length of the exterior member than that of the interior plate 28 avoids the creation of localized zones of abrupt change in applied stress.

It will be evident from the foregoing that by the use of the invention multi-sectional fixtures are readily assembled to required lengths at the point of use without recourse to riveting, welding or the like, the assembling operations being accomplished in minimum time and with minimum requirement for skill.

As the aligned assembly is completed, it will further be noted that at each joint the adjacent transverse housings 15 come together as closures for each other. In addition to their function as receptacle mountings, these housings also act as transverse braces for their respective fixture sections.

When the desired number of fixture sections 10—in the present illustration four sections—have been joined in the manner described, the multi-section fixture is ready for installation. The normal procedure is for two workmen to raise the structure by its end sections and first suspend the assembly from the overhead mounting 11 by means of the outer two conduit tubes 12. The previously described joining means, while maintaining rigid transverse alignment of the fixture sections at all times, have sufficient vertical resilience to allow the assembly to flex or sag centrally when supported only by the outer tubes, as shown in FIGURE 1. This central depression causes the inner conduit tubes to stand free below the overhead mounting 11 thus allowing the outer two tubes to be secured without interference and consequently facilitating the mounting operation by only two workmen rather than the greater number who would be required if all the supporting tubes had to be secured at the same time. Having accomplished the outer mountings as described, the same two workmen raise and attach the inner supporting tubes 12, bring the composite fixture into final horizontally aligned position as indicated by the previously noted dot-and-dash line in FIGURE 1.

It will have been observed that the exterior clamping members 22, which are of relatively shallow vertical extent, engage the channel sections 10 only along an extreme upper longitudinal zone of the latter. By this provision, which allows a slight hinging effect, the flexing action described above is confined almost entirely to the joints themselves, thus eliminating any undue bending stress on the sections 10. The latter accordingly may be made of relatively light material with consequent low cost and ease of handling and installation.

With the fixture mounted in operational position as set forth, final wiring connections are completed, suitable bottom and end closures are applied and any desired type of reflectors or shades may be affixed. Obviously any one or more of the supporting tubes 12 may serve as supply conduit or conduits, depending on location of overhead wiring facilities and whether the lamps of the various sections are to be controlled by a single switch or individual switches.

The invention has been illustrated herein as a combination including four sections 10, but it will be obvious that similar combination procedure with similar advantages may be applied to produce unitary fixtures of any desired practical length. It will also be evident that while the invention has been set forth in preferred form it is is not limited to the exact embodiments illustrated, as various changes and modifications may be made without departing from the scope of the appended claims.

What is claimed is:

1. The combination with at least two lighting fixtures positioned in end-to-end relationship with each fixture having a top and side portions, said side portions having opposing inwardly extending channels substantially parallel to and adjoining said top portion, a plate within and bridging adjoining fixtures, said plate being positioned against the underside of said top portions and retained in said position by said inwardly extending channels, an elongated clamping member having U-shaped side jaws gripping the top edges of said fixtures and engaging said channels and means on said clamping member to force said jaws into clamping engagement with said fixtures and said plate to secure said fixtures in end-to-end engagement.

2. The combination according to claim 1 wherein said clamping member includes a pair of parallel side portions with said jaws being carried along corresponding edges of said side portions and wherein said side portions include aligned openings and bolts engaging said openings for forcing said jaws into clamping engagement with said fixtures.

3. The combination according to claim 1 wherein said clamping member comprises a central U-shaped section having upwardly extending legs and a side portion joined to the upper edge of each leg and extending downwardly and outwardly therefrom to a plane defined by the bottom of said U-shaped section, said jaws being carried by the lower edges of said side portions, and said side portions and legs having aligned openings and bolts engaging said openings, the bottom of said U-shaped section bearing against the top of said fixtures with said bolts tightened to hold said jaws in firm clamping engagement with said fixtures.

References Cited in the file of this patent

UNITED STATES PATENTS

| | | |
|---|---|---|
| 1,785,870 | Marles | Dec. 23, 1930 |
| 1,855,550 | Hyde | Apr. 26, 1932 |
| 2,632,620 | Hurley | Mar. 24, 1953 |
| 2,711,876 | Goebel | June 28, 1955 |
| 2,734,995 | Lenze et al. | Feb. 14, 1956 |
| 2,849,595 | Zurawski | Aug. 26, 1958 |